Jan. 12, 1965 K. C. WEHR 3,165,643

LOGIC CIRCUIT

Filed Oct. 27, 1961

WITNESSES

Leon J. Vaga

James F. Young

INVENTOR

Karl C. Wehr

BY Ernest P. Klipfel

ATTORNEY

United States Patent Office 3,165,643

Patented Jan. 12, 1965

3,165,643

LOGIC CIRCUIT

Karl C. Wehr, Ellicott City, Md., assignor to Westinghouse Electric Corporation, East Pittsburgh, Pa., a corporation of Pennsylvania Filed Oct. 27, 1961, Ser. No. 148,122
11 Claims. (Cl. 307—88.5)

The present invention relates generally to static logic circuits and more particularly relates to an exclusive OR logic circuit.

The advent of semiconductor devices such as the tunnel diode exhibiting a quantum mechanical tunneling phenomena has given rise to many computer networks utilizing the inherent fast switching speed of the device. In some logic networks, such as a binary full adder, the inverse carry signal is generally not available even though the inverse variables may be readily available. One use of the exclusive OR circuit in accordance with the present invention is to generate the sum in such a binary adder without the inverted carry of the previous stage.

Accordingly, an object of the present invention is to provide an exclusive OR circuit for a binary adder utilizing semiconductor devices exhibiting the quantum mechanical tunneling phenomena.

Another object of the present invention is to provide a two input logic circuit having an output only when one input or the other input but not both is present.

Another object of the present invention is to provide an exclusive OR circuit wherein a two unit input threshold level device and a single unit input threshold level device are interconnected by time delay means which delays a two unit input signal to the one unit input threshold level device thereby allowing clamping means responsive to the switching of the two unit input threshold level device to limit the condition of the single unit input threshold device to a level insufficient for the single input threshold level device to switch states.

Further objects and advantages of the present invention will be readily apparent from the detailed description taken in conjunction with the drawing, in which.

Figure 1:
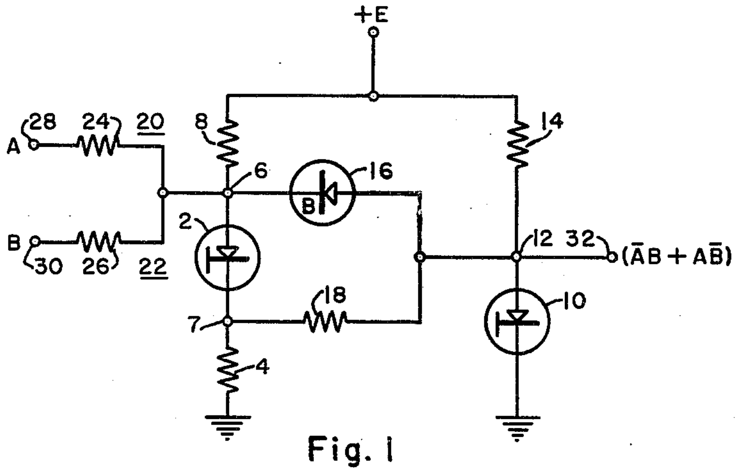
FIGURE 1 is an electrical schematic diagram of an illustrative embodiment of the present invention.

Referring to FIG. 1, a first tunnel diode 2, having a cathode connected to a point of reference potential or ground through a resistor 4 and an anode connected to a common junction 6, is connected to be biased by a potential source E through a biasing resistor 8. A second tunnel diode 10 having a cathode connected to ground and an anode connected to a common junction 12, is connected to be biased by the same potential source E through a respective biasing resistor 14. A backward diode 16 is connected across the common junctions 6 and 12 thereby connecting the anode of each tunnel diode. A resistive element 18 is connected between the cathode of the first tunnel diode 2 to the anode of the second tunnel diode 10. Input means, comprising a first input circuit 20 and a second input circuit 22, and each including a respective input resistor 24 and 26 connecting respective input terminals 28 and 30 to the common junction 6, is adapted to receive unitary or binary "ONE" signals at either or both of the input terminals 28 and 30 and in turn provide a summation of the input signals to the diodes. Output means comprising an output terminal 32 is connected to the common junction 12 thereby assuming the voltage of the anode of the second tunnel diode 10.

Figure 2:
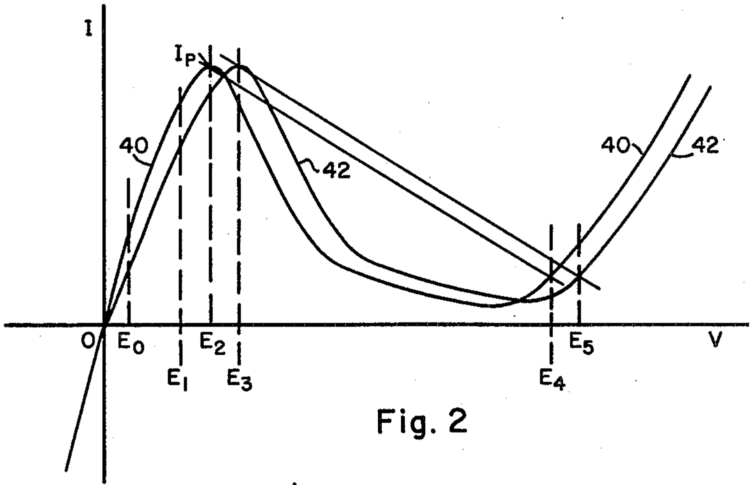
FIGURE 2 illustrates characteristic I–V curves of selected devices utilized in the illustrative embodiment of FIG. 1.

The logic circuit shown in the embodiment of FIG. 1 illustrates tunnel diode devices each having similar characteristic current-voltage curves as typically represented by the curve 40 in FIG. 2 for diode 10. For reverse bias, the resistance of the tunnel diode is small and current increases freely with increasing voltage. In the forward direction of voltage across the tunnel diode, the current therethrough increases to a sharp maximum $I_p$ on a portion of the characteristic curve referred to as the low voltage side. Further increase in the voltage across the diode results in the negative resistance portion of the characteristic curve wherein the current through the diode drops to a deep and broad minimum, referred to as the valley current $I_v$. Still further increase in the voltage across the diode causes the current to increase again on a portion of the characteristic curve to be referred to as the high voltage side to a maximum value determined by the maximum voltage appearing across the diode in accordance with the circuit parameter of the logic network. The breakover current level as determined by the peak tunneling current $I_p$ is hereinafter referred to as the current threshold or breakover level of the device. Of course, any suitable device exhibiting a similar characteristic curve may be utilized in the logic circuit. Further, it is to be understood that the term "tunnel diode" is herein meant to include all semiconductor devices exhibiting the aforementioned characteristics.

The first tunnel diode 2 is chosen to have a characteristic curve 42 which is skewed by the addition of resistor 4 which connects the cathode to ground. As a result the current breakover level of the first tunnel diode 2 occurs at a voltage $E_3$ which is greater than the voltage $E_2$ across the second tunnel diode 10 when its current breakover level occurs by an amount designated as one voltage unit.

Figure 3:
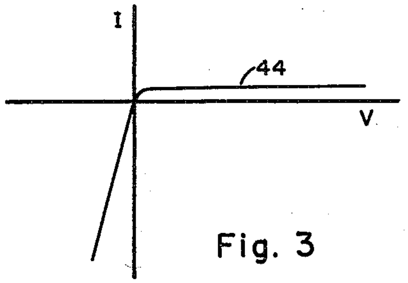
FIGURE 3 is a characteristic I–V curve of still another device utilized in the illustrative embodiment.

For purposes of clarity, reference will not be made to the characteristic curve 44 of the backward diode 16 as shown in FIG. 3. It can be seen that for a reverse voltage thereacross the current therethrough increases greatly while a voltage across the backward diode 16 in the forward direction offers substantially an indefinite resistance to current flow in that direction over a predetermined range of the characteristic curve. It will be found that upon appearance of a unitary voltage signal at the junction 6 from either input terminal 28 or 30, the backward diode 16 will switch to allow flow therethrough. The backward diode 16 is selected to have a switching time which is longer than the switching time of the first tunnel diode 2.

The operation of the logic circuit shown in FIG. 1 is best described graphically by reference to the characteristic curves 40 and 42 shown in FIG. 2. With no input signals on either input terminal 28 or input terminal 30, the first tunnel diode 2 is biased by potential source E so that a biasing potential $E_0$ exists at the cathode or junction 7 of tunnel diode 2 and a potential $E_1$ exists at the junction 6. Under these same conditions, the second tunnel diode 10 is biased so that a potential $E_1$ also exists at the junction 12. Accordingly, it can be seen by reference to the characteristic curve 40 of the second tunnel diode 10 that a one unit input potential will be sufficient to increase the voltage across the second tunnel diode 10 to a magnitude indicated as $E_2$ which is sufficient to exceed its current breakover level, thereby decreasing the amount of current therethrough and switching the tunnel diode from its low voltage state to its high voltage state. On the other hand, a one unit input signal simultaneously present at both input terminals 28 and 30 is required to increase the potential across the first tunnel diode 2 from its biasing potential $E_1$ to the potential $E_3$ necessary to exceed the current threshold or breakover level of the first tunnel diode 2 as shown by its characteristic curve 42 in FIG. 2.

Therefore, if a single unit input signal appears on either input terminal 28 or 30, satisfying the logical conditions $(\bar{A}B+A\bar{B})$, junctions 6 and 12 will seek a new potential $E_2$ which is the addition of the biasing potential previously across the tunnel diodes and the single unit input. From the characteristic curves it can be seen that the potential $E_2$ is not sufficient to cause the first tunnel diode to switch voltage states, but is sufficient to cause the second tunnel diode 10 to switch voltage states. After the second tunnel diode 10 has switched voltage states, that is, from low voltage state to high voltage state, the junction 12 will be driven to a new and higher potential level as indicated at $E_4$. The high voltage state of the second tunnel diode 10 will not however be seen at the junction 6 since these two junctions are electrically isolated by the backward diode 16. A change in potential at the junction 6 will be seen by the junction 12 after a time delay, namely the switching time of the backward diode 16, but a change in potential at the junction 12 will not be seen at the junction 6 due to the substantially infinite impedance the backward diode 16 presents in the forward direction.

If single unit input signals appear simultaneously at both input terminals 28 and 30, a potential $E_3$ will appear at the common junction 6 which will be sufficient to cause the first tunnel diode 2 to switch from its low voltage state to its high voltage state. When the first tunnel diode 2 changes voltage states a new potential $E_5$ will appear at the common junction 6 and the potential at common junction 12 will be very near to the point of reference potential or ground since the first tunnel diode 2 is now conducting considerably less current than when in its low voltage state.

In order that the potential at the common junction 7 on the cathode side of the tunnel diode 2 can be switched to substantially ground potential before the second tunnel diode 10 switches voltage states, the backward diode 16 is selected to have a switching time which is longer than the switching time of the first tunnel diode 2. Accordingly, when an input appears simultaneously at both input terminals 28 and 30, and the inputs are of unitary value such as from a preceding logic state similar to the illustrative embodiment shown in FIG. 1, the potential $E_3$ at the common junction 6 is not allowed to immediately appear at the junction 12. After the first tunnel diode 2 has changed voltage states, the common junction 7 will be very close to ground potential thereby preventing the common junction 12 on the anode side of the second tunnel diode 10 from sufficiently increasing its potential to cause the second tunnel diode to breakover. Rather, the potential across the second tunnel diode 10 is clamped to a lower potential level never allowing the potential across the second tunnel diode to increase to the potential $E_2$ necessary for the diode to breakover.

It can be seen that the output terminal 32 which is connected to the anode of the second tunnel diode 10 will assume the potential of the anode of the second tunnel diode 10 and provide an output voltage at the output terminal 32 in response to the voltage state of the second tunnel diode 10. When a single unit input is present at either input terminal 28 or 30, it is insufficient to breakover the first tunnel diode 2 but is sufficient after a time delay determined by the switching time of the backward diode 16, to breakover the second tunnel diode 10 causing it to assume its high voltage state. But when a single unit input signal is present at both input terminals 28 and 30 totaling an equivalent two unit input at junction 6, the first tunnel diode 2 breaks over first to assume its high voltage state thereby clamping the second tunnel diode 10 to a potential insufficient to allow the second tunnel diode to breakover. The clamping is accomplished prior to substantial conduction of the backward diode 16. The internal resistance of the backward diode 16 is selected to be higher than the internal resistance of either of the tunnel diodes 2 and 10.

It can therefore be seen that when assigning the letter A and the letter B to respective input signals appearing at the input terminals 28 and 30 the output from the logic circuit will be $(\bar{A}\times B+A\times\bar{B})$. Both A and B must be simultaneously present when no output is desired, that is, no output for either logical condition $\overline{AB}$ and AB. Resetting of the logic circuit may be accomplished in several ways, such as simply pulsing the source potential E or inserting a negative potential $-E$ at the resistor 8 and 14.

While the present invention has been described with a degree of particularity for the purposes of illustration, it is to be understood that all alterations, equivalents, and modifications within the spirit and scope of the present invention are herein meant to be included.

I claim as may invention:

1. An exclusive OR circuit comprising, in combination; a first and a second tunnel diode each having a low voltage state and a high voltage state and substantially equal current breakover levels; a backward diode interconnecting said tunnel diodes and poled to block current from the second tunnel diode to the first tunnel diode; means for biasing each said tunnel diode to its low voltage state; output means responsive to the voltage state of said second tunnel diode; and input means including a first and a second input circuit for selectively receiving one unit input signals increasing the voltage across each said tunnel diode an additional step function over and above the biasing means for each said unitary input signal present; circuit means for exceeding the current threshold level of said second tunnel diode upon receipt of a unitary input signal at only one of said input circuits and for exceeding the current breakover level of said first tunnel diode in response to the simultaneous occurrence of an input signal at both input circuits; and means responsive to breakover of said first tunnel diode for clamping the current through said second tunnel diode to a level less than its current breakover level prior to breakover of said second tunnel diode.

2. An exclusive OR circuit comprising, in combination; a first and a second tunnel diode each having a low voltage state and a high voltage state and substantially equal current breakover levels; a backward diode interconnecting said tunnel diodes and poled to block current from the second tunnel diode to the first tunnel diode; said backward diode selected to have a longer switching time than the switching time of said first tunnel diode; means for biasing each said tunnel diode to its low voltage state; output means responsive to the voltage state of said second tunnel diode; input means including a first and a second input circuit for exceeding the current breakover level of said second tunnel diode when an input is present at only one of said input circuits and for exceeding the current breakover level of said first tunnel diode when an input is only present at both said input circuits; and clamping means responsive to the switching of said first tunnel diode to its high voltage state for clamping the voltage across said second tunnel diode to a level prohibiting current flow therethrough to exceed the current threshold level of said second tunnel diode.

3. The apparatus of claim 2 wherein means are provided for skewing the characteristic I–V curve of said first tunnel diode so that the voltage thereacross at its current breakover level is greater than the voltage across the said second tunnel diode when at its current breakover level.

4. A two input logic circuit having an output only when one input or the other input is present comprising, in combination; a first tunnel diode having a characteristic curve exhibiting a low voltage state and a high voltage state separated by a two unit input threshold level; a second tunnel diode having a characteristic I–V curve exhibiting a low voltage state and a high voltage state separated by a one unit input threshold level; each said tunnel diode having an anode and a cathode; a backward diode connected between the anodes of said tunnel diodes and poled to block current from the anode of said second tunnel diode to the anode of said first tunnel diode; means for connecting the cathode of said second tunnel diode to a reference potential; a resistive element connecting the cathode of said first tunnel diode to a point of potential reference value; means for biasing each said tunnel diode to its low voltage state; said backward diode having a longer switching time than the switching of said first tunnel diode; a plurality of input means each comprising a respective input resistor and respective input terminal with the input resistor connecting the anode of said first tunnel diode to its respective input terminal for selectively providing a unitary input signal to each tunnel diode, whereby an input signal at only one said input means is sufficient to exceed only the current threshold level of said second tunnel diode but an input signal simultaneously present at both input means is sufficient to exceed the current threshold level of said first tunnel diode; and means responsive to the breakover of said first tunnel diode for limiting current through said second tunnel diode to a level less than its respective current threshold level upon breakover of said first tunnel diode and prior to switching of said backward diode; and output means responsive to the output state of said second tunnel diode.

5. A two input logic circuit having an output only when one input or the other input is present comprising, in combination; a first tunnel diode and a second tunnel diode each having a characteristic curve exhibiting a low voltage state and a high voltage state and each having a current breakover level of substantially equal magnitude; a backward diode interconnecting said tunnel diodes and poled to block current from said second tunnel diode to said first tunnel diode; means for biasing said first tunnel diode to require at least two simultaneous inputs thereto to exceed its current breakover level and for biasing said second tunnel diode to require only one input to exced its respective current breakover level; and two input circuit means each for providing a unitary input signal to said first tunnel diode and to said second tunnel diode; the first tunnel diode switching at a faster speed than said backward diode upon the simultaneous occurrence of a unitary input signal at both input circuit means; and clamping means for limiting current flow through said second tunnel diode to a level less than its respective current breakover level in response to the switching of said first tunnel diode.

6. An exclusive OR logic circuit comprising, in combination; a first tunnel diode and a second tunnel diode each having the characteristic curve exhibiting a low voltage state and a high voltage state and each having a current breakover level of substantially the same magnitude; two input means each comprising an input circuit connected to provide a unitary increase in current through said first tunnel diode due to an input signal at a selected input circuit; backward diode means interconnecting said first tunnel diode and said second tunnel diode for connecting said two input means across said second tunnel diode; said backward diode selected to have a switching time substantially longer than the switching time of said first tunnel diode whereby the switching of said first tunnel diode occurs first in point of time in response to the simultaneous presence of an input signal at both input means; circuit means responsive to the switching of said first tunnel diode for clamping said second tunnel diode to a voltage less than that necessary to exceed the current threshold level of said second tunnel diode; and output means responsive to the voltage state of said second tunnel diode.

7. An exclusive OR logic circuit comprising, in combination; a first tunnel diode and a second tunnel diode each utilized in a switching mode and each having a characteristic current breakover level of substantially equal magnitude; input means comprising a first input circuit and a second input circuit each for connecting a unitary input signal across said first tunnel and said second tunnel diode; means for biasing said first tunnel diode to require simultaneous inputs at both input circuits to exceed the current breakover level of said first tunnel diode to thereby switch its conducting state; means for biasing said second tunnel diode to require an input thereto from only one of said input circuits to exceed its respective current threshold level and thereby switch its conducting state; time delay means for delaying the simultaneous occurrence of input signals at both input circuits to said second tunnel diode until said first tunnel diode has switched conductive states; and means responsive to the switching of said first tunnel diode for clamping said second tunnel diode to a level less than its respective current breakover level.

8. An exclusive OR circuit comprising, in combination; a first tunnel diode and a second tunnel diode each having a substantially non-conducting state and a current breakover level which must be exceeded for the tunnel diode to assume a substantially conducting state; means for biasing said first tunnel diode whereby a two unit input signal is required to switch its conductive states; means for biasing said second tunnel diode whereby a single input signal is required to exceed its current breakover level and assume its conducting state; input means for selectively providing a combination of input signals to said first tunnel diode; backward diode means for connecting said last-mentioned means to said second tunnel diode; said backward diode means selected to have a switching time considerably longer than the switching time of said first tunnel diode; and circuit means responsive to the switching of said first tunnel diode for clamping said second tunnel diode to a level prohibiting switching of said second tunnel diode upon occurrence of the simultaneous input of signals at both input circuit means.

9. An exclusive OR circuit comprising, in combination; a first tunnel diode having a two unit input threshold level and a second tunnel diode having a single unit input threshold level; input means operably connected to said first tunnel diode for selectively providing a single unit input and a two unit input signal to said first tunnel diode; backward diode means connecting said input means to said second tunnel diode; said backward diode means selected to have a switching time longer than the switching time of said first tunnel diode; said backward diode means poled to only allow current from said input means and from said first tunnel diode to said second tunnel diode; and circuit means responsive to the conductive state of said first tunnel diode for clamping said second tunnel diode to a potential level less than its respective threshold level.

10. A logic circuit comprising, in combination; a two unit input threshold level device; a single unit input threshold level device; input means connected to said two unit input threshold level device; output means responsive to the condition of said single unit input threshold level device; means interconnecting said two unit input threshold level device and said input means to said single unit input threshold level device for delaying a two unit input signal appearing at said input means to the one unit input threshold level device; and clamping means responsive to the switching of the two unit input threshold level device for limiting the condition of said single unit input threshold device to a level insufficient for said single unit input device to switch states.

11. A logic circuit comprising, in combination; a plurality of input means; first tunnel diode means having a current breakover level which is exceeded when an input signal is simultaneously present at each input means; a second tunnel diode means having a current breakover level which is exceeded when an input signal is present at at least a predetermined lesser number of input means; output means responsive to the condition of said second tunnel diode means; means connected to said plurality of input means for allowing current to said second tunnel diode means only after a time delay greater than the switching time of said first tunnel diode means; and means responsive to the switching of said first tunnel diode means for clamping the current through said second tunnel diode means to a level less than its current breakover level.

References Cited in the file of this patent

Chow et al.: "Tunnel Diode Circuit Aspects and Applications," AIEE Conference Paper, January 1960.